C. A. PARSONS.
LUBRICATION OF SLIDING COUPLINGS.
APPLICATION FILED SEPT. 12, 1917.
1,303,586.
Patented May 13, 1919.
2 SHEETS—SHEET 1.
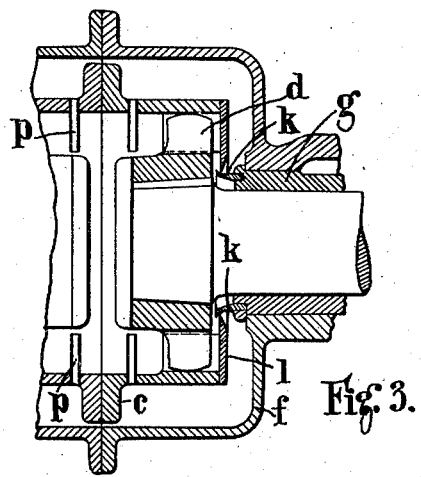
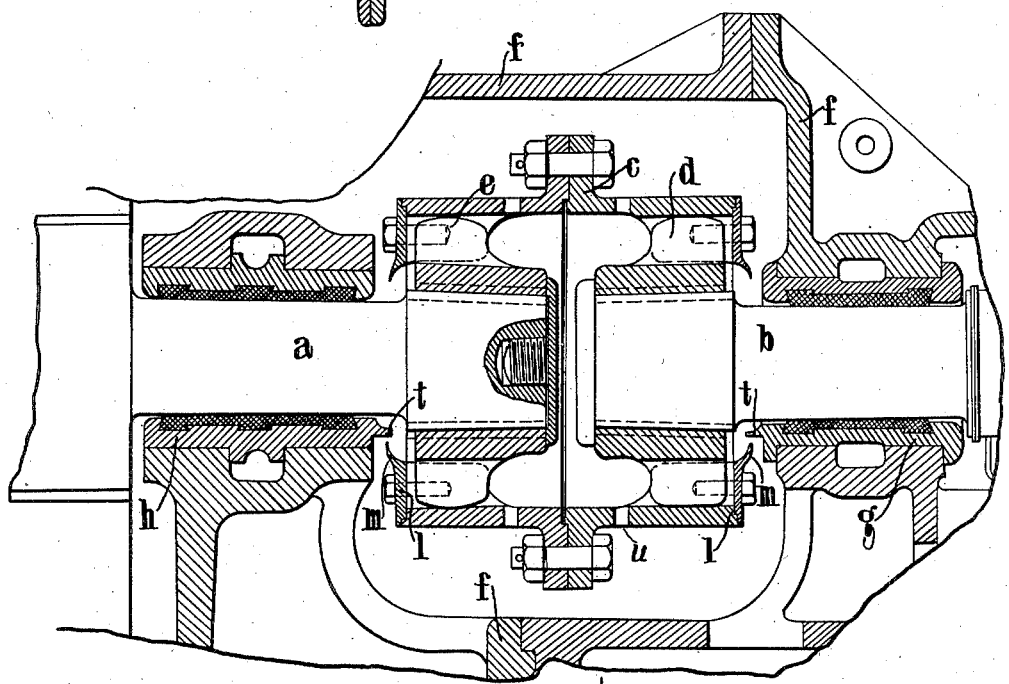
INVENTOR
Charles Algernon Parsons,
BY
Spear, Middleton, Donaldson & Spear
ATTORNEYS C. A. PARSONS.
LUBRICATION OF SLIDING COUPLINGS.
APPLICATION FILED SEPT. 12, 1917.

1,303,586.

Patented May 13, 1919.
2 SHEETS—SHEET 2.

INVENTOR
Charles Algernon Parsons,
BY
Spear, Middleton, Donaldson & Spear
ATTORNEYS

UNITED STATES PATENT OFFICE.

CHARLES ALGERNON PARSONS, OF WALLSEND, ENGLAND.

LUBRICATION OF SLIDING COUPLINGS.

1,303,586. Specification of Letters Patent. Patented May 13, 1919.

Application filed September 12, 1917. Serial No. 191,010.

*To all whom it may concern:*

Be it known that I, CHARLES ALGERNON PARSONS, residing at Turbinia Works, Wallsend-on-Tyne, in the county of Northumberland, England, have invented certain new and useful Improvements in the Lubrication of Sliding Couplings, of which the following is a specification.

The present invention relates to the lubrication of sliding couplings such, for instance, as are fitted in geared turbine installations to allow the necessary relative axial movement between a turbine rotor shaft and its pinion shaft.

The invention consists in the provision of baffle plates so placed as to deflect the lubricating oil into the body of the sliding coupling or to retain the lubricating oil in the body of the coupling.

The invention also consists in baffle plates so arranged as to deflect the oil leaving the bearings into the body of the sliding coupling and retain the oil in the body of the coupling to the required depth.

The invention further consists in a sliding coupling having baffle plates for retaining the oil in the body of the coupling, the oil being introduced into the coupling through one of the coupled shafts which is provided with a central oil passage.

The invention also consists in the improved sliding couplings hereinafter described.

Referring to the accompanying drawings:

Figure 1 is a longitudinal section of one form of the invention.

Fig. 2 shows a modified form, while

Fig. 3 shows another modification.

Figure 2:
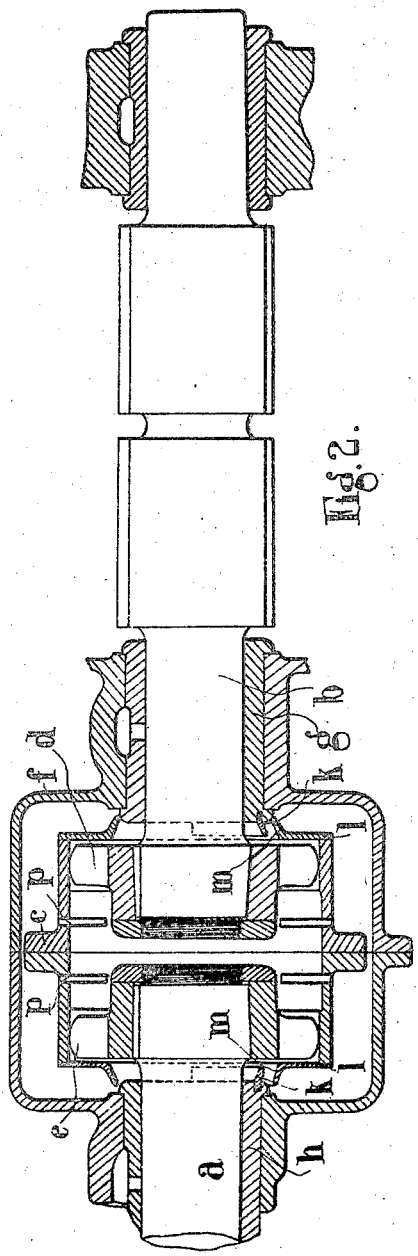

In carrying the invention into effect as illustrated in Fig. 1, two co-axial shafts *a b* are connected by a claw coupling comprising a hollow cylindrical central piece *c* adapted to engage with claw members *d e* on the ends of the two shafts, the central portion being preferably surrounded by a casing *f* in which the adjacent end bearings *g h* of the shafts are formed.

Integral with the bearing adjacent to the coupling, circular or partly circular baffles *t t* are provided projecting toward the coupling and adapted to deflect the oil leaving the shaft bearings into the body of the coupling. There are also provided end pieces *l l* adapted to inclose the coupling and to prevent the escape of oil from the central cylindrical member, these end pieces being provided with outwardly projecting flanges *m m* which assist in directing the oil into the body of the coupling. The oil passes from either end of the coupling to the center between the claws.

The holes *u u* drilled in the body of the coupling allow the oil to escape.

In the form of the invention shown in Fig. 2, inwardly projecting pipes *p p* are provided in the central part of the coupling, through which the oil can escape, the depth of the projection of these pipes being less than that of the end flanges *l l* but sufficient to insure that the working faces of the claws are drowned in oil. This insures a flow of oil across the working faces of the claws. In this modification also instead of the baffles *t t* in one with the bearings, circular or partly circular baffle plates *k k* are fitted to the bearings so that they project toward the coupling.

According to the form of the invention shown in Fig. 3, the circular pieces *k* on the shaft bearings *g* deflecting the oil from the bearing into the coupling are extended beyond the inner lip of the end pieces *l* which inclose the coupling.

In the above described modifications of the invention, the oil supplied to the couplings is that which escapes from the bearings.

In all the modifications of the invention above described, except those in which the pipes *p* are replaced by holes in the central body *c*, centrifugal action causes the oil to stand up to the level of the inner diameter of the end plates, or to the level of the inner ends of the pipes *p*, so that the claws of the coupling are drowned, and at the same time have fresh oil circulating through them.

- Having now described my invention, what I claim as new and desire to secure by Letters Patent is:—

1. A sliding coupling comprising in combination a hollow cylindrical central piece, claw members adapted to be connected to the shafts to be coupled, means on said central piece adapted to engage with said claw members and baffle plates adapted to conduct oil from the bearings to the interior of said central piece, as set forth.

2. A sliding coupling comprising in combination a hollow cylindrical central piece, claw members adapted to be connected to the shafts to be coupled, means on said central piece adapted to engage with said claw members, baffle plates extending inward radially and then outwardly attached to said central piece, and baffle plates adapted to conduct oil from the bearings to the interior of said central piece, as set forth.

3. A sliding coupling comprising in combination a hollow cylindrical central piece, claw members adapted to be connected to the shafts to be coupled, means on said central piece adapted to engage with said claw members, a casing surrounding said central piece, said casing carrying bearings for the shaft, and baffle plates adapted to conduct oil from the bearings to the interior of said central piece, as set forth.

4. A sliding coupling comprising in combination a hollow cylindrical central piece, claw members adapted to be connected to the shafts to be coupled, means on said central piece adapted to engage with said claw members, inwardly projecting pipes open at their inner ends and adapted to carry off oil beyond a certain level from said central piece, and baffle plates adapted to conduct oil from the bearings to the interior of said central piece, as set forth.

In testimony whereof I have affixed my signature.

CHARLES ALGERNON PARSONS.